(12) United States Patent
Déjean et al.

(10) Patent No.: US 7,797,622 B2
(45) Date of Patent: Sep. 14, 2010

(54) VERSATILE PAGE NUMBER DETECTOR

(75) Inventors: Hervé Déjean, Grenoble (FR);
Jean-Luc Meunier, St Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 774 days.

(21) Appl. No.: 11/599,947

(22) Filed: Nov. 15, 2006

(65) Prior Publication Data
US 2008/0114757 A1    May 15, 2008

(51) Int. Cl.
*G06F 17/27* (2006.01)
(52) U.S. Cl. ............... 715/231; 715/230; 715/232; 715/233; 715/234
(58) Field of Classification Search ............ 715/230, 715/231, 232, 234, 236
See application file for complete search history.

(56) References Cited

U.S. PATENT DOCUMENTS

| | | | | |
|---|---|---|---|---|
| 5,699,453 | A * | 12/1997 | Ozaki | 382/176 |
| 5,940,583 | A | 8/1999 | Taira et al. | |
| 6,256,610 | B1 * | 7/2001 | Baum | 704/260 |
| 6,839,848 | B1 * | 1/2005 | Kirikoshi et al. | 726/2 |
| 7,190,480 | B2 * | 3/2007 | Sturgeon et al. | 358/1.17 |
| 2003/0152293 | A1 * | 8/2003 | Bresler et al. | 382/305 |
| 2004/0088165 | A1 * | 5/2004 | Okutani et al. | 704/260 |
| 2004/0208371 | A1 * | 10/2004 | Liu et al. | 382/173 |
| 2005/0154979 | A1 | 7/2005 | Déjean et al. | |
| 2006/0101058 | A1 | 5/2006 | Chidlovskii et al. | |
| 2006/0155700 | A1 | 7/2006 | Déjean et al. | |
| 2006/0155703 | A1 | 7/2006 | Déjean et al. | |
| 2006/0156226 | A1 | 7/2006 | Déjean et al. | |

FOREIGN PATENT DOCUMENTS

| | | |
|---|---|---|
| EP | 1603072 | 12/2005 |
| WO | WO 2005/119580 | 12/2005 |

OTHER PUBLICATIONS

Herve Dejean and Jean-Luc Meunier, Structuring Documents According to Their Table of Contents, Proceedings of the 2005 ACM Symposium on Document Engineering, Nov. 2-5, 2005, ACM Publishing, pp. 2-9.*

(Continued)

*Primary Examiner*—Doug Hutton
*Assistant Examiner*—Andrew R Dyer
(74) *Attorney, Agent, or Firm*—Fay Sharpe LLP (57) ABSTRACT

A method for detection of page numbers in a document includes identifying a plurality of text fragments associated with a plurality of pages of a document. From the identified text fragments, at least one sequence is identified. Each identified sequence includes a plurality of terms. Each term of the sequence is derived from a text fragment selected from the plurality text fragments. The terms of an identified sequence comply with at least one predefined numbering scheme which defines a form and an incremental state of the terms in a sequence. A subset of the identified sequences which cover at least some of the pages of the document is computed. Terms of at least some of the subset of the identified sequences are construed as page numbers of pages of the document. Additional page numbers may be identified by considering one or more features of the terms in the subset of identified sequences.

25 Claims, 5 Drawing Sheets

OTHER PUBLICATIONS

Claus Gravenhorst; docWORKS/METAe The Engine for Automated Metadata Extraction and XML Tagging; CCS; Jul. 2004; p. 8.*
U.S. Appl. No. 11/032,817, filed Jan. 10, 2005, Déjean et al.
U.S. Appl. No. 11/116,100, filed Apr. 27, 2005, Déjean et al.
U.S. Appl. No. 11/360,951, filed Feb. 23, 2006, Meunier et al.
U.S. Appl. No. 11/360,963, filed Feb. 23, 2006, Meunier et al.
X.Lin, *Header and Footer Extraction by Page-Association, Information Infrastructure Laboratory*, HP Laboratories Palo Alto, May 6, 2002, hpl.hp.com/techrepports/2002/HPL-2002-129.pdf, 2002.
e.aib.uni.linz.ac.at/metaeengine/engine/html, Oct. 19, 2006.
.ccs-gmbh.de/index_e.html, Oct. 19, 2006.
*PDF-Extraktor*, .ovidius.com/en/tools/utilities/PDF-Extraktor, Oct. 3, 2006.
T.J.Michalak, C.Madsen, M.Hurst, *Harvard University Library Open Collections Program: Final Report, Appendix A: Description of CCS DocWORKS Software and its Effect on the OCP Production Workflow*, http://ocp.hul.harvard.edu/report/final/pages_12.html, Oct. 19, 2006.

* cited by examiner

VERSATILE PAGE NUMBER DETECTOR

CROSS REFERENCE TO RELATED PATENTS AND APPLICATIONS

The following U.S. patent applications, which are incorporated herein in their entireties by reference, are mentioned:

Application Ser. No. 11/360,951, filed Feb. 23, 2006, entitled RAPID SIMILARITY LINKS COMPUTATION FOR TABLE OF CONTENTS DETERMINATION, by Meunier, et al.;

Application Ser. No. 11/360,963, filed Feb. 23, 2006, entitled TABLE OF CONTENTS EXTRACTION WITH IMPROVED ROBUSTNESS, by Meunier, et al.; and Application Ser. No. 11/116,100, filed Apr. 27, 2005, entitled STRUCTURING DOCUMENT BASED ON TABLE OF CONTENTS, by Déjean, et al.

BACKGROUND

The exemplary embodiment relates to the information storage and processing arts. It finds particular application in conjunction with the conversion of documents available in print-ready or image format into a structured format that reflects the logical structure of the document.

Legacy document conversion relates to converting unstructured documents existing in page description language formats such as Adobe's portable document format (PDF), PostScript, PCL-5, PCL-5E, PCL-6, PCL-XL, and the like, into structured documents employing a markup language such as extensible markup language (XML), standard generalized markup language (SGML), hypertext markup language (HTML), and the like. Such structure can facilitate storage and access of the document. The particular motivations for converting documents are diverse, typically including intent to reuse or repurpose parts of the documents, desire for document uniformity across a database of stored information, facilitating document searches, and so forth. Technical manuals, user manuals, and other proprietary reference documents are common candidates for such legacy conversions.

In structured documents, content is organized into delineated sections such as document pages with suitable headers/footers and so forth. Such organization typically is implemented using markup tags. In some structured document formats, such as XML, a document type definition (DTD) or similar document portion provides overall information about the document, such as an identification of the sections, and facilitates complex document structures such as nested sections.

Issues arise in reconstructing conventional constructs such as titles, headings, captions, footnotes, and the like, in particular, the detection of the page numbers of a document. One difficulty with the versatile detection of page numbers resides in the wide variability of their appearance, layout, and numbering scheme within a document, over a collection, and from collection to collection. For example, in the case of appearance, the font type, font size, and font color of page numbers can vary from one document to another and even within the same document. Layout may also vary. In some documents, the page numbers may always appear at the same position on the page, or they may change position on odd/even pages. In other documents, the page numbers may have a different place for the first page of each section, or have various different positions in the various parts of the document, for example, a different position in the preface from that of the table of contents, the body, or the annexes. Sometimes the position of the page number is different for each chapter. In addition, in the case of scanned documents, the position may vary due to translation or skew between scanned pages.

Numbering schemes can also vary. Conventional numbering schemes generally employ Arabic numerals, Roman numerals, or letters. However, there are also page numbering schemes of the form N/M, where N is the page number and M is the total number of pages, or where N is the section number and M the sub-section or page number within the section. There are also composite page numbers of the form: TOC-N, INTRO-N, where N is the page number, counted from the beginning of the document or of the section. There are also schemes in which the numbering is representative of the structure of the document, for example, some of the digits represent the section and others the page. In one scheme of this type, the section number occupies 5 digits followed by the page number in the section. However, even in such highly structured schemes, a different convention may be found in some sections. It is quite common to have multiple numbering schemes in use in the same document. For example, the front matter is partially numbered with Roman numerals, the body in a different manner, and any annex in another manner.

Conventional approaches for applying page numbers work at the page level. For pages missing a number, a human operator validates the output.

INCORPORATION BY REFERENCE

The following published applications and patents, which are incorporated herein in their entireties by reference, are mentioned:

Published Application No. 2006/0156226, published Jul. 13, 2006, entitled GLOBAL APPROACH FOR HEADER/FOOTER DETECTION, by Déjean, et al., discloses a method for identifying header/footer content of a document in order to sequence text fragments comprising recognizable text blocks as derived from the document. Header/footer zones are defined by textual content having a low textual variability. An alternative embodiment identifies pagination constructs by comparing selected text-boxes for similarity and proximity and clustering the text boxes satisfying a predetermined similarity value. The clustered text boxes are deemed to comprise pagination constructs.

Published Application No. 2006/0155700, published Jul. 13, 2006, entitled METHOD FOR STRUCTURING DOCUMENTS BASED ON THEIR LAYOUT, CONTENT AND COLLECTION, by Déjean, et al., relates to document format conversion and in particular to the cataloging of legacy documents in a marked-up format such as extensible markup language (XML).

Published Application No. 2006/0155703, published Jul. 13, 2006, entitled STRUCTURING DOCUMENT BASED ON TABLE OF CONTENTS, by Déjean et al., and Published Application No. 2006/0155703, published Jul. 13, 2006, entitled METHOD AND APPARATUS FOR DETECTING A TABLE OF CONTENTS AND REFERENCE DETERMINATION, by Déjean, et al., relate to methods for identifying a table of contents in a document.

Published Application No. 2005/0154979, published Jul. 14, 2005, entitled SYSTEMS AND METHODS FOR CONVERTING LEGACY AND PROJECTING DOCUMENTS INTO EXTENDED MARKUP LANGUAGE FORMAT, by Chidlovskii, et al.; Published Application No. 2006/0101058, published May 11, 2006, entitled SYSTEM AND METHOD FOR TRANSFORMING LEGACY DOCUMENTS INTO XML DOCUMENTS, by Chidlovskii, et al., disclose conversion of legacy and proprietary documents into extended mark-up language format.

PCT Published Application No. WO 2005/119580, published Dec. 15, 2005, entitled METHOD AND DEVICE FOR THE STRUCTURAL ANALYSIS OF A DOCUMENT, by Ralph Tiede, discloses a method for the structural analysis of a document. The method includes reducing a draft to elementary structural units and producing generic objects therefrom. One or more properties are allocated to the generic objects and a structure, which reproduces the draft, is produced in an electronic format by means of the generic objects.

U.S. Pat. No. 5,940,583 by Taira, et al. discloses a copying apparatus which reads an original with an image reader. If captions are recognized in the original, the apparatus stores a page number of the original into a memory, thereafter, performs copying based on the stored page number such that the original page including the caption is transferred onto the front side of a recording sheet.

BRIEF DESCRIPTION

In accordance with one aspect of the exemplary embodiment, a method for detection of page numbers in a document includes identifying a plurality of text fragments associated with a plurality of pages of a document. From the identified text fragments, at least one sequence is identified. Each identified sequence includes a plurality of terms: Each term is derived from a text fragment selected from the plurality text fragments. The terms of an identified sequence comply with at least one predefined numbering scheme which defines a form and an incremental state of the terms in a sequence. A subset of the identified sequences which cover at least some of the pages of the document is computed. Terms of at least some of the subset of the identified sequences are construed as page numbers of pages of the document.

In accordance with another aspect, a system for detection of page numbers includes memory which stores instructions for (a) identifying a plurality of text fragments associated with a plurality of pages of a document, from the identified text fragments, (b) identifying at least one sequence, each identified sequence comprising a plurality of terms, each term derived from a text fragment selected from the plurality text fragments, the terms of a sequence complying with at least one predefined numbering scheme which defines a form and an incremental state of the terms in a sequence, (c) computing a subset of the identified sequences, and (d) construing terms of the subset of sequences as page numbers of pages of the document. A processor executes the instructions.

In accordance with another aspect, a method for detection of page numbers in a document includes identifying a plurality of text fragments associated with a plurality of pages of a document, each of the identified fragments including a term which complies with a form of at least one predefined numbering scheme. For each page of the plurality of pages in turn: a) for each identified text fragment of the page, determining whether an existing sequence will accept the text fragment, a sequence only accepting a text fragment if the text fragment fits with the form of at least one predefined numbering scheme for the existing sequence and fits an incremental state for the existing sequence, b) for each existing sequence, if the sequence will accept a text fragment, adding the term of the text fragment to the existing sequence and incrementing its state, c) for each identified text fragment that has not been added to any of the existing sequences, start a new sequence which includes the text fragment term, the new sequence serving as an existing sequence for a subsequent page of the document, d) optionally, for each existing sequence to which no text fragment term is added for the page, feeding the sequence with a hole which designates the absence of a text fragment term for the sequence for that page, and e) optionally, for each sequence which does not meet a predefined minimum density, closing the existing sequence against addition of fragment terms from subsequent pages of the document, the predefined minimum density being a function of a total number of terms in the existing sequence and a total number of holes in the existing sequence. The method further includes computing a subset of the sequences, optionally, extrapolating sequences of the subset to identify terms for holes in the sequences and optionally, identifying additional text fragments of the document as potential page numbers by comparing features of the additional text fragments with features of the text fragments of the identified sequences. Terms of the subset of sequences and optionally also terms of the additional fragments are construed as page numbers of pages of the document.

In accordance with another aspect, a method for detection of page numbers in a document includes identifying a plurality of text fragments associated with a plurality of pages of a document. From the identified text fragments, at least one sequence is identified. Each identified sequence includes a plurality of terms. Each term is derived from a text fragment selected from the plurality text fragments, the terms of a sequence complying with at least one predefined numbering scheme which defines a form and an incremental state of the terms in a sequence. A subset of the sequences is computed, including scoring nodes of the sequences based on a length of the sequence as a function of a first length factor. Each term in the sequence is represented by a separate node. A model is developed for identifying additional text fragments as potential page numbers, the model being based on at least one feature of at least one text fragment from which the terms of the first subset of sequences are derived. The model is applied to at least some of the identified text fragments in the document to identify additional text fragments that are potential page numbers. An optimal set of terms from the subset of the sequences and additional text fragments is computed, including scoring nodes of the sequences and additional text fragments based on a length of the sequence or additional text fragment as a function of a second length factor which is more prone to accept shorter sequences than the first length factor and construing at least some of the terms of in the optimal set as page numbers of pages of the document.

DETAILED DESCRIPTION

The exemplary embodiment provides a system and method for detection of page numbers of an original document. The method may include identifying text fragments of pages of the document and determining whether any of the identified fragments form a sequence covering two or more pages. In particular, the method may include identifying text fragments associated with a first page of a document (or predefined region thereof) and determining whether any of the identified text fragments is or includes a term which complies with a predefined numbering scheme and if so, considering the terms of these text fragments as potentially part of a numbering sequence. On the next page of the document, text fragments are identified and a determination is made as to whether any of these identified text fragments includes a term which complies with a predefined numbering scheme. For each of those terms which do, a determination is also made as to whether the term fits a numbering sequence which also includes one of the terms of the text fragments already identified for the first (and/or a previous) page and if so, the text fragment is added to that sequence. Any of the text fragments comprising terms complying with a numbering scheme but which does not fit a numbering sequence which includes a term from one of the text fragments from the previous page(s) is considered as potentially a part of a new numbering sequence. The method is repeated for each page for all pages of the document, with terms being added to existing sequences, as appropriate, and new sequences started where a term does not fit with an existing sequence. An optimal subset of the identified sequences is then computed which covers at best the entire document (i.e., at best, one term of the sequence per page of the document). The terms of the optimal subset of sequences may then be construed as being the page numbers of pages of the document. Additional page numbers may be detected by comparing appearance or position features of the text fragments in the document with those of text fragments from which the terms of the optimal subset are derived. The exemplary system includes a processor which executes instructions for performing a method for detection of page numbers on an input document.

The detection of page numbers is advantageous in a number of instances. First, it may be of benefit to remove the page numbers from a document. This may be used in the transformation of the set of pages of a document into a continuous flow of text, without any pagination element, and in particular without the original page numbers. Second, it may be useful to index the pages of a document by their printed page number. Typically, this is the case in the digital library domain where the page numbers remain an important means for navigating a document. Third, it is common for a few of the pages in a document not to show any number despite being part of a certain numbering sequence. It may be desirable to have each page of the document numbered, e.g., in a viewable format, according to the sequence.

Rather than detection of page numbers solely at the page level, the exemplary system and method enables detection of page numbers at the document level and thereby can avoid the need to rely primarily on the layout or appearance related properties of the page numbers for their detection. The method is particularly useful in cases where page numbers extracted from an original document are unreliable, such as when processing a document collection or processing documents generated by optical character recognition (OCR) software where page numbers are small and the layout information provided by OCR engines is frequently unreliable.

In the exemplary method, an intrinsic property of the page numbering for a document is exploited in a first stage. Specifically, the numbering forms an increasing sequence of terms, one per page, or more generally it is constituted by a set of non-overlapping increasing sequences. This functional approach is independent of any layout or typographic characteristics and can therefore cope seamlessly with the variability typically found in such documents. In a second, optional stage, layout and typographic information may be employed to improve further the precision and/or recall of the exemplary method.

A digital document may be considered as a set of pages, each page containing a set of text fragments. For some pages, the set may of course contain no text fragments, either because the page is blank or because it includes images not recognized as text. A text fragment typically corresponds to a word or in some cases a line or a part of a line. This is a model that fits well with the output of PDF-to-XML converters or with OCR engines. The digital document typically includes text fragments which comprise the original page numbers for the document. However, in many instances, the original page numbers may be different from the page position in the document. For example, a chapter of a book which has been scanned and OCR processed may have twelve pages, however, the original numbers of these pages in the book may be 559-570.

In general, the original document is in an unstructured format, which in the present case means that the text portions may include page numbers but the structure of the document does not identify them as such. In converting the unstructured document to a structured digital document, the original page numbers become part of the text, but are not identified as being page numbers in the document structure. The exemplary system and method seek to identify the original page numbers for further processing, e.g., tagging, indexing, and/ or removal.

The original document may be a page description language document, such as a PDF, PostScript, PCL-5, PCL-5E, PCL-6, PCL-XL or other suitable document. In PDF, for example, portions of text and other document content, such as images, are in the form of objects which are assigned to pages of the document by a job ticket. In general, the page numbers may form a part of one or more of the text objects. The job ticket may be associated with the file as a file header or embedded in the document. The structured format to which the original document is converted may be any suitable markup language, such as XML, SGML, XML, HTML, or the like. XML allows the delivery of structured data in a standard, consistent way. XML is a complementary format to HTML and both are derived from the Standard Generalized Markup Language (SGML); however, unlike HTML, XML does not have a fixed vocabulary.

SGML and XML, for example, are both text-based formats that provide mechanisms for describing document structures using markup elements or tags (words surrounded by "<" and ">"). For example, in one embodiment, once the page number has been identified, a page number may be identified within the text by <pagenumber>6</pagenumber>, for page 6 of the document. The numeral 6 may appear in the printed or on-screen displayed document, while the <pagenumber> generally remains hidden to the viewer but serves to identify the numeral 6 as a page number during searching (for example, a viewer may request a search tool to "go to page 6").

In embodiments where the page numbers are to be removed from the text, once the page number is identified, the structured format may be free of embedded page tags. Alternatively, a page number tag which identifies the removed page number may be embedded in the appropriate text object, or otherwise associated therewith, such as .

Figure 1:
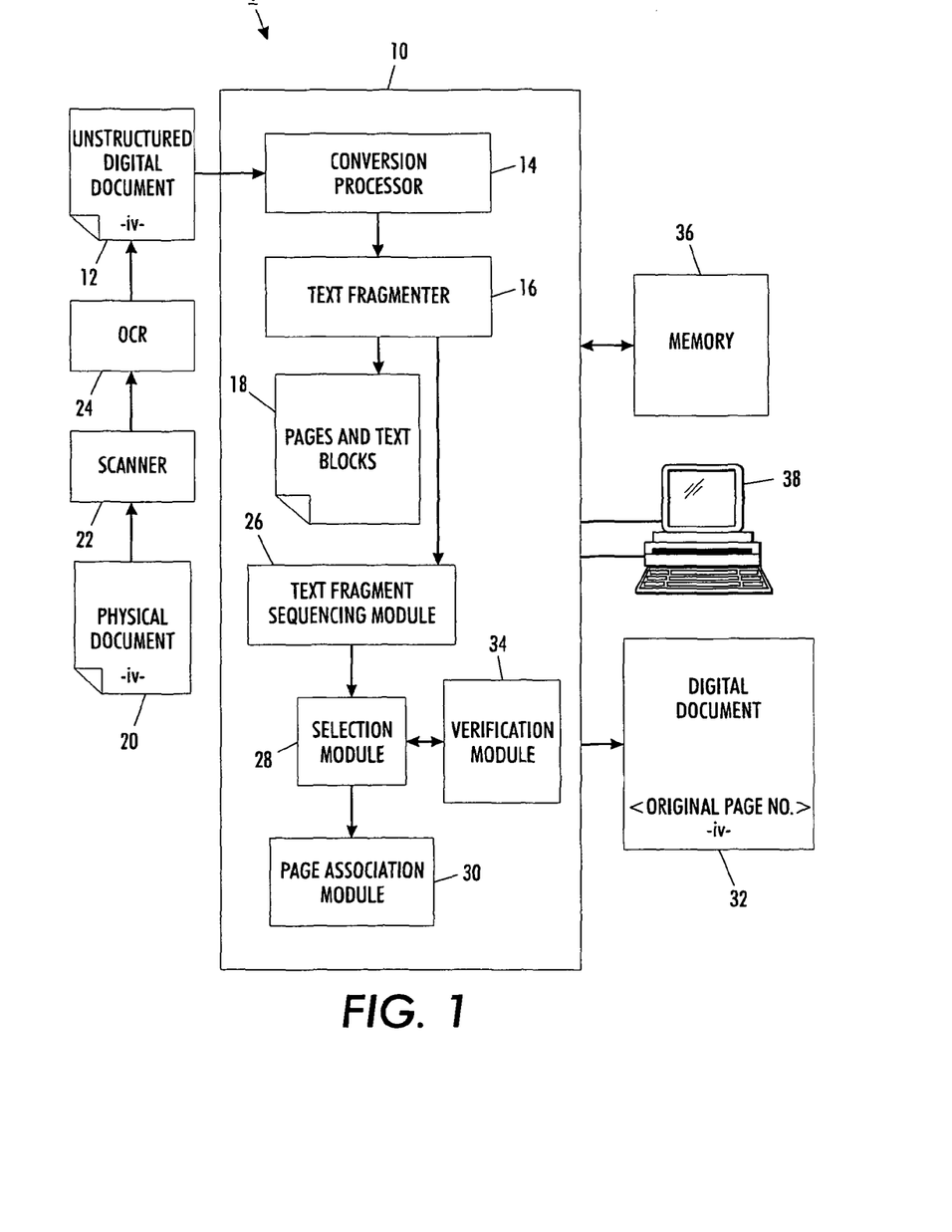
FIG. 1 is a functional block diagram of an apparatus for detection of page numbers of an original document in accordance with one aspect of the exemplary embodiment.

FIG. 1 shows an assembly I which includes a processor 10 comprising a plurality of processing modules for automated processing of an input digital document. An unstructured document 12, e.g., a technical manual, user manual, other proprietary reference document, or the like in a PDF format, is converted by conversion processor 14 into an alternative language format, such as XML or other structured format, and when in such format can be processed for various purposes as a legacy document. The converter 14 may be an off-the-shelf converter which converts the input original document into a list of text strings from an XML file produced from the original document. A text fragmenter 16 breaks the converted document into an ordered sequence of text fragments 18. In the case of a physical document, such as a paper document 20, the document is suitably scanned using an optical scanner 22 and processed by an optical character recognition (OCR) processor 24 to form the digital document. For a text document, each line may become a fragment, ordered line-by-line. For an XML or HML document, text fragments may be based at the word level, where each word is generally distinguished from adjacent words by a space (words here can include one or more recognized characters of any type, including letters and/or numbers). Fragmenter 16 may also effect a position allocation of the document text content so that the page segmentation and vertical positions per page of the text content are preserved. For plain text format, the vertical position used is a line number. For a proprietary format, the document can be converted into plain text format, or can be converted into a format where information about the vertical position exists. For example, a PDF2XML converter can provide page segmentation and positional information of the blocks of texts.

A text fragment sequencing module 26 identifies text fragments representative of an increasing series by applying rules which define one or more numbering schemes. In particular, the sequencing module 26 seeks a sequence of text fragments forming an increasing series and covering at best the whole document. In general, a plurality of such sequences may be identified. A selection module 28 selects an optimal sequence or group of sequences by application of defined selection criteria. A page association module 30 may tag the pages of the document with tags 32 based on the terms of the optimal sequence or otherwise annotate the document with information based on the output of the sequencing module 28. Alternatively, or additionally, the page association module 30 may implement another automated process, such as removal of the identified fragments which comprise the selected sequence. Optionally, a verification module 34 implements verification steps to confirm the previously identified page numbers and/or identify additional page numbers for pages where no page number was previously identified.

Each of the processing modules 14, 16, 26, 28, 30 and 34 may execute instructions for performing the exemplary method described in greater detail below, which may be stored in associated memory 36. Text fragments, documents, identified sequences, rules defining numbering schemes, and the like may also be stored in memory 36. The memory 36 may represent any type of computer readable medium such as random access memory (RAM), read only memory (ROM), magnetic disk or tape, optical disk, flash memory, or holographic memory. In some embodiments, the processing modules 14, 16, 26, 28, 30, 34 and memory 36 may be combined in a single chip. A user interface 38, such as a keyboard, touch screen, cursor control device, or combination thereof, permits interaction of a user with the assembly 1.

The exemplary assembly 1 may be implemented in a computing device, such as a general purpose computer or a dedicated computing device. The computer may be a PC, such as a desktop, a laptop, palmtop computer, portable digital assistant (PDA), cellular telephone, pager, or other suitable processing device. The various components of the computer may be all connected by a bus (not shown). As will be appreciated, only a portion of the components which are incorporated into a computer system are shown in FIG. 1. Since the configuration and operation of programmable computers are well known, they will not be described further. Further processing may be undertaken on the documents output by the page association module.

Figure 2:
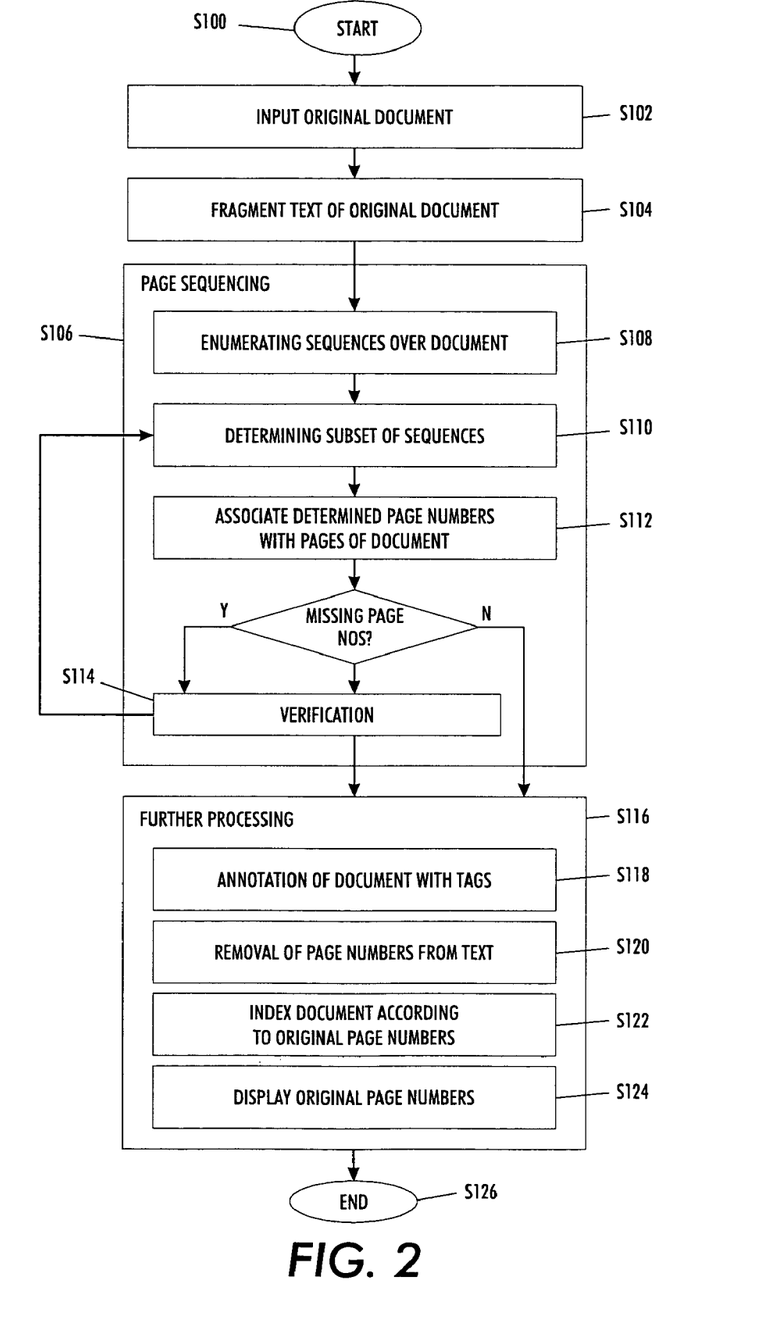
FIG. 2 is a flowchart for a method of detection of page numbers of an original document in accordance with another aspect of the exemplary method.

With reference to FIG. 2, an exemplary method which may employ the assembly of FIG. 1 is illustrated. It is to be appreciated that the exemplary method may include fewer, more, or different steps from those shown and need not proceed in the order illustrated. The method illustrated in FIG. 2 may be implemented in a computer program product that may be executed on a computer. The computer program product may be a tangible computer-readable recording medium on which a control program is recorded, or may be a transmittable carrier wave in which the control program is embodied as a data signal. The illustrated method may be entirely automated or may include some user input, as noted herein.

The method begins at step S100. At step S102, an original document, 12, is converted to a structured format.

At step S104, the converted document is fragmented into text fragments. Depending on the nature of the document, the text fragments may be a line of text, a portion of a line, or a single word. The fragments are identified by the page on which they are found, where each page generally corresponds to a page of the original document.

At step S106, text fragments are examined to determine whether they represent a sequence over two or more pages. In particular, the system relies on a stored set of numbering schemes, such as Arabic, Roman, and the like. The set of numbering schemes is extensible since a new scheme must simply conform to a simple programmatic interface, discussed below.

For any given set of numbering schemes, the sequencing step S106 may employ three or four substeps: enumerating sequences (S108), optimizing (S110), optionally verification (S112), and page association (S114). These steps may be performed as a sequence or in one or more return loops. At step S108, sequences occurring over consecutive document pages of text fragments that (a) all belong to the same numbering scheme (e.g. all Roman numerals) and (b) which form an incremental sequence, are identified. This step may comprise identifying all possible such sequences of two or more text fragments.

At step S110, an optimal subset of non-overlapping sequences is selected so as to cover at best the entire document by applying a scoring function to the identified sequences.

At step S112, each page is associated with its corresponding term in the sequence that was selected for that part of the document. Step S112 may further comprise extrapolating the sequence for any missing numbers. At the end of stage S112, there may still be pages for which no term is assigned.

At step S114, further processing of the document may optionally occur for verification of the optimal sequence and/ or identification of missing page numbers. In one embodiment, this step is only performed if there are pages for which the optimal sequence(s) identified at step S110 is missing one or more page numbers (holes). In another embodiment, step S114 may be performed irrespective of whether any holes are identified. Following step S114, steps S110 and S112 may be repeated and a new optimal sequence established. Optionally, where step S114 is performed, step S114 precedes step S112.

At step S116, a computer implemented step may be initiated, based on the output of step S112 and/or S114. This further processing step may include one or more of:

a) annotating the document or pages thereof (step S118), e.g., with XML tags comprising information derived from the assigned terms, b) removing some or all of the identified sequence of terms corresponding to the original page numbers from the digital document (step S120), c) indexing the document according to the identified sequence of terms corresponding to the original page numbers from the digital document (step S122), and d) displaying some or all the terms on the digital document (step S124), in particular for those pages where the original page number is missing or appears to be missing.

The method ends at step S128. It will be appreciated that further processing steps may be performed on the structured document, in addition to those described, such as identification of chapter headings and/or subheadings and annotating the document with tags corresponding to the headings and/or indexing the headings according to the page numbers of the original document, displaying a table of contents according to the page numbers of the original document, and the like.

The assumption that the two constraints placed on the fragment sequences in step S108 (same numbering scheme and incrementality) conjugated with an optimal selection of sequences to cover at best the whole document in step S110 are enough to determine the page numbering, independently of the position and appearance of these numbers proves to be reliable in practice, although in some cases, improvements may be achieved by the optional added verification step (step S114).

Numbering Schemes

Numbering schemes may be defined generally as having a defined form and a defined incrementality. By "form," it is meant that a numbering scheme defines the syntactic form of the page numbers it will accept. For example, the Arabic scheme syntactic form consists of a series of digits. By "incrementality," it is meant that an instance of a numbering scheme holds a state that enforces an increase of the page number over a sequence of pages. It may or may not tolerate some holes in a sequence, each hole corresponding to a page of the structured document where no page number is found.

Where holes are tolerated, extrapolation for missing values may be performed. Extrapolation generally includes assigning a page with a hole, the next value in the sequence to that of the preceding page where the form of the sequence permits extrapolation of the sequence with an acceptable degree of confidence. The acceptable degree of confidence may depend on the ultimate use of the information. The confidence level may be higher when the sequence terms for the adjacent preceding and subsequent pages are identified and is particularly high when the incremental state accepts only one possible value for the page with the hole.

In one embodiment, the set of numbering schemes includes some or all of the following numbering schemes, each of which is based on a set of characters (often referred to as parsable character data (PCDATA)), such as letters and/or numerals (all of which will be referred to generally as numbers), which define an ordered sequence:

1. Arabic numerals: the syntactic form is a series of digits and the constraint for this numbering scheme is to observe a +1 between consecutive terms of the sequence corresponding to consecutive pages. Missing numbers are accepted and taken into account for the +1 constraint. Extrapolation for missing numbers is also possible. Examples of this numbering scheme include sequences such as 1, 2, 3, 4, and 66, 67, 68, 69, _, 71, where "_" represents a hole.

2. Roman numerals: the syntactic form is a series of roman numerals: i, ii, iii, iv, etc. in either upper or lower case, and the constraint for this numbering scheme is the same as that observed for the Arabic numerals to which they correspond (i=1, ii=2, etc), as described above.

3. Single letters: the syntactic form is a series of letters, such as a, b, c, d, generally of the same case (i.e., upper or lower case letters) and the constraint for this numbering scheme is to observe a +1 in the normal alphabet sequence between consecutive terms of the sequence corresponding to consecutive pages. In some embodiments, a sequence x, y, z, a does not comply with the constraints, although in other embodiments, this may be permitted. Missing letters are accepted and taken into account for the +1 constraint. Extrapolation for missing numbers is also possible.

4. Composite numbering: this numbering scheme targets any composition of Arabic/Roman/letter numbers, such as a numbering scheme "1.3.2, 1.3.2, 1.3.3, etc.," or "toc-1, toc-2, toc-3," or "A-5, A-6, A-7." Such a numbering scheme may accept values formed of any string constant(s), separator(s), and one or several Arabic/Roman/Letter value(s). In practice, the possible separators are defined by a regular expression, such as: [\|\t|\.|,|;|:|\/|\%|&|\*|\-|_|\+]+. A fragment is tokenized accordingly and tokens are matched against the Arabic/Roman/Letterfamily. Any non-matching token is considered as a string constant for the sequence. In turn, the first observed page number of such a sequence defines a sequence prototype composed of separators, number family, and string constants (i.e. anything that is neither a separator nor an Arabic/Roman/letter number). It defines the syntactic form for all remaining terms of the sequence. Missing numbers may be tolerated.

For example, a composite sequence initiated for the term "TOC-1" may define a prototype such as: <string-constant> TOC. <separator>–<Arabic>. As for the increase constraint, a valid fragment may be mapped to a strictly positive integer, i.e., [1, +∞[For example, the number value may be considered as a value expressed in any convenient base, such as base-10000 (which ignores Arabic/Roman/letter values above 9999). Such a simplification is not generally damaging for most applications although higher bases may be employed if appropriate. Where the numbering scheme is known to comprise fewer numbers, a lower base may be employed.

Extrapolation for missing numbers in composite numbering schemes may be more difficult than for simpler numbering schemes. However, it may be possible in certain simple cases. For instance, extrapolating for (1.1, 1.2, _, 1.4) is straightforward, while on the contrary, the number between 1.2.3 and 2.1.1 cannot be extrapolated.

5. Generic Ascii family: in this case the numbering scheme accepts any string that starts with an alphanumeric character and wherein all strings have all the same length as the first accepted fragment. The increase constraint consists of checking that two consecutive terms are strictly equal apart for one character that obeys a+1 (in terms of ascii/unicode numerical code). In general, the transition from, for instance, AZ to BA does not fit with the constraint and a new sequence will be started for BA, BB, BC, etc. Missing numbers may be tolerated in this numbering scheme. Extrapolation is not generally possible.

The first four schemes cover a large part of the documents usually encountered, while the last (general ascii) is sufficiently generic that it covers most cases. The first four schemes have quite a strict and precise increase constraint while the latter is both looser and less precise, and therefore more subject to noise. A fragment may therefore be checked against these families in the order they are presented above to minimize the effects of noise. As will be appreciated, additional numbering schemes may be defined and added to the group of schemes at any time. For example, if a document or group of documents is expected to follow a specialized numbering scheme, constraints for this scheme may be added to the group of numbering schemes to be checked and applied to each fragment early on in the order. Additionally or alternatively, if some of the numbering schemes are found to generate too much noise or otherwise be inappropriate, they may be dropped from the group for certain classes of documents.

In one embodiment, a class NumberingScheme may be defined which defines a plurality of numbering schemes, such as some or all of the five schemes described above. The method at step S108 may include the following:

1. A class method "fit" that checks whether or not a fragment fits with the scheme's form.
2. Two instance methods "startPage" and "endPage" that are called before and after processing a page and that let a sequence object of that family deal with its incremental state and the possible holes in the sequence.
3. An instance method "accept" that checks whether a fragment is acceptable by a sequence in view of its internal state.
4. An instance method "extrapolate" that delivers a real or an extrapolated page number for a physical page.
5. Any new family is a specialization of the class NumberingScheme. This design readily allows the incorporation of a new family, if required.

The steps of the exemplary method will now be described in further detail. In the enumeration step (S108), a search is made for all possible sequences of terms that would fit with one (or more) of the defined numbering schemes. For example, a greedy enumeration is performed, considering all pages in turn and all text fragments per page in order to enumerate all sequences that it is possible to make with the text fragments of the document, over a consecutive set of pages. The code of one exemplary algorithm can be represented in abbreviated form as follows:

```
START, with an empty set of sequences of observed fragments
    Foreach page in turn:
        Foreach text fragment of the page:
            Foreach sequence:
                If the text fragment fits with the sequence's form and
                incremental state:
                    Then feed this sequence with this observed text fragment
            if the text fragment has not been consumed by any sequence:
            Then:
                Foreach numbering scheme:
                    If the text fragment matches the numbering
                    scheme's form:
                        Then start a new sequence of that numbering
                        scheme
                            and feed it with this observed fragment
        Foreach sequence:
            If the sequence did not consume any text fragment on this page:
            feed it with a "hole"
```

Dealing with holes improves the accuracy of the method because they are commonly observed in many documents. In addition, it is particularly beneficial when processing OCR-ed documents: page numbers are often small elements that are regularly missed or badly recognized by OCR engines. Generally, holes may be dealt with due to the startPage/endPage methods, rather than via the last for each construct in the pseudo code above.

To assist in evaluating sequences, the coverage and length of a sequence may be defined as follows: the "coverage" of a sequence is the set of pages inclusively between the first and last page where a fragment of the sequence (a term) was observed. The "length" of a sequence is the number of observed terms in it. By construction, the length plus the number of holes of a sequence equals the cardinal number of its coverage. For example, a sequence comprising four terms and two holes has a length 4 and a coverage cardinal number of 6. In general, the sequence begins and ends with a term. Thus, holes, where present in a sequence, are bounded by terms.

The selection step (S110) will now be described in greater detail. This step includes selecting an optimal subset of the identified sequences. Specifically, the selection module 28 applies a set of rules to select one or more sequences of terms from those sequences identified at step S108. The rules generally favor the selection of longer sequences over shorter ones and avoid or prohibit the overlap of sequences (pages comprising terms from two or more selected sequences). In some embodiments, sequences which are below a threshold in terms of length and/or coverage may be eliminated from consideration.

The rules governing the selection of an optimal set of sequences may include assigning to each term and/or each sequence a score which reflects how well the term and/or sequence fits with predetermined selection criteria. For example, longer sequences may score higher than shorter ones and sequences with fewer or no holes may score higher than those with a greater number of holes. The numbering scheme may also impact the score. For example, Roman or Arabic numbeing schemes may be scored more highly than general ASCII. In one embodiment, an algorithm, such as a Viterbi shortest path algorithm, is used to select the best subset of sequences based on the scores assigned by the scoring function. In particular, each page is associated with N+1 states, where N is the number of sequences covering that page (i.e., the page is in the coverage of the sequence). The additional state simply reflects an absence of a page number for a page (a hole).

Figure 3:
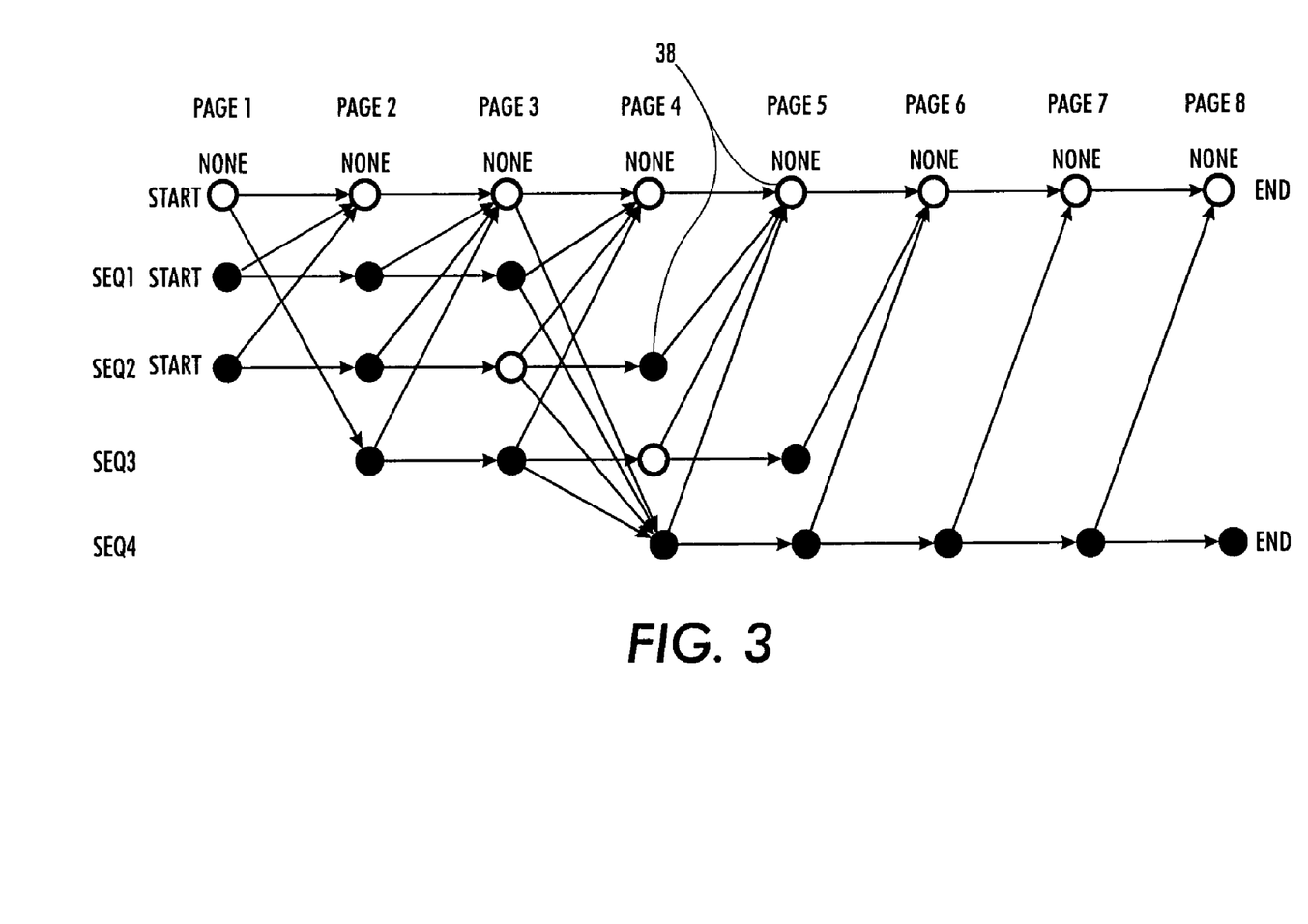
FIG. 3 illustrates the application of an algorithm to an eight page document showing four states comprising sequences.

By way of illustration, FIG. 3 simulates the application of the algorithm to an eight page document where four possible sequences are identified (Seq. 1, Seq. 2, Seq. 3, and Seq. 4). The sequences are arranged in a matrix with the x axis corresponding to the number of pages in the document and the y axis, the sequences. The arrows in FIG. 3 indicate all possible transitions, given the requirement that a sequence can be taken only at its starting point. Each term or hole of a sequence is represented by a node 38. To initialize the matrix, each node 38 is assigned a score, for example, using a scoring function. The score of a path from the beginning to the end of the document is the sum of the score of the visited nodes. To favor longer sequences, the score of a node representing a term generally increases with the length of its associated sequence. The score of a hole may be lower than the score for a term, e.g., zero. In general, all term nodes of a sequence which are traveled in a given path have the same score. Where a sequence is only partially traversed, the scoring function may be recomputed to account for the shorter length of the sequence.

Various scoring functions are possible. In one embodiment, a scoring function of the following form is used:

$$\text{score(node)} = 1 - \frac{f}{\text{length(sequence)}}$$

where f is a constant, which is referred to herein as the length factor.

The length of the sequence (of which the node to be scored forms a part) is as defined above, except in that when only a portion of the sequence forms a part of the path, only that portion is used in determining the length. The length factor f may have any suitable value. In general, higher values of f increase precision, but may have an adverse affect on recall. For example, when f is 2, the score for each node is zero for a sequence having two terms. In one embodiment, f may be at least 1, for example, from about 1.5 to 5, although higher values may be appropriate in some cases. An advantage of this type of scoring function is that it discards any sequence shorter than f since its nodes are accorded a negative score. In addition, when the path through the matrix leaves a sequence before its end, it is easy to correct the previously computed score to account for the skipped observations. For example, if a path leaves a particular sequence after M nodes, skipping N nodes, then for the above scoring function, the scores may be recomputed by subtracting N.f/(N+M) from the score which was originally accorded to node M to account for a reduced effective length of the sequence. In this way, the Viterbi shortest path algorithm retains its advantageous property of only needing to look at the current set of states.

To compute the optimal score, a path may be traversed from its terminal (last) node back to the first node in the path. At each node, the path which yields the highest score is generally followed. As each node is traversed, its score is added to the total score for the path.

Step S112, which includes associating page numbers to each page, is simply achieved by choosing the best (highest scoring) path. In the case of the matrix shown in FIG. 3, assuming that f is 2.5, the best path will most likely be the one which includes sequences 1 and 4, since this path utilizes the two sequences with the highest coverage and also avoids leaving any sequences midway. The terms of these sequences may thus be used as the original numbers of the document. As noted above, some page numbering schemes permit extrapolation. In such cases, any holes in the sequence can be completed in an automatic way.

The exemplary embodiment provides a sequence-based approach for detecting page numbers which builds on the intrinsic property of the page numbering of a document and which can be divorced from any positional features and/or appearance features of the page numbers (such as one or more of their location on the page, and typographic features, such as font type, font size, font color, and the like). In some embodiments, however, such positional/appearance features information can be considered in the enumeration stage, although for most documents, it should not be necessary. Additionally, in some instances, it can actually reduce the precision of the method since, if the intrinsic property that is relied upon is not respected in a given document, the method will discard at least some sequences or portions thereof from being enumerated, reducing the usefulness of the page numbering. In general, a method which enumerates the numbering without consideration of any positional/appearance features information and which optionally exploits this information in a second stage (verification step S114) provides more useful results. It is also contemplated that a consideration of positional/appearance features information may be utilized in scoring the terms of an enumerated sequence (step S112), as discussed in further detail below.

As noted above, an optional verification step S114 may be employed which utilizes additional information from the document to verify the selected sequences and/or identify additional terms. For example, the method may include finding regularities among the detected page numbers with respect to their typography and/or position. This can be performed, for example, by using data clustering methods. In one embodiment an agglomerative complete link clustering method may be separately performed on groups of pages, such as on i) all odd pages, ii) even pages, iii) all pages). Once a regularity is established which enables the page numbers to be distinguished with an acceptable reliability from other text, it may be used to identify characters representing page numbers for those pages for which no page number has already been assigned. Additionally, or alternatively, the regularity may be used to identify any term from any enumerated sequence that does not comply with the regularities that emerged in the verification step. Such terms may then be discarded.

Following step S114, the method may return to step S110 where the Viterbi algorithm is rerun by reapplying the algorithm to the enumerated sequences, as modified by step S114. This second, or any subsequent rerunning of the Viterbi algorithm, may be performed with a smaller length factor f than was used in a prior execution of step S110. For example, the length factor for the repeat of step S110 may be about 0.5. The use of a verification step may lead to improvements in the accuracy of page detection, particularly on collections where many short sequences appear. However, in some collections, it may not provide a benefit or may yield a decrease in the accuracy.

In one embodiment, a supervised machine learning approach may be exploited to improve the verification stage (step S114). The numbers detected in the main, "functional", approach may be used as a training set with a featureset based on typography and position. The first and second stages thus rely on different properties of the text fragment.

Figure 4:
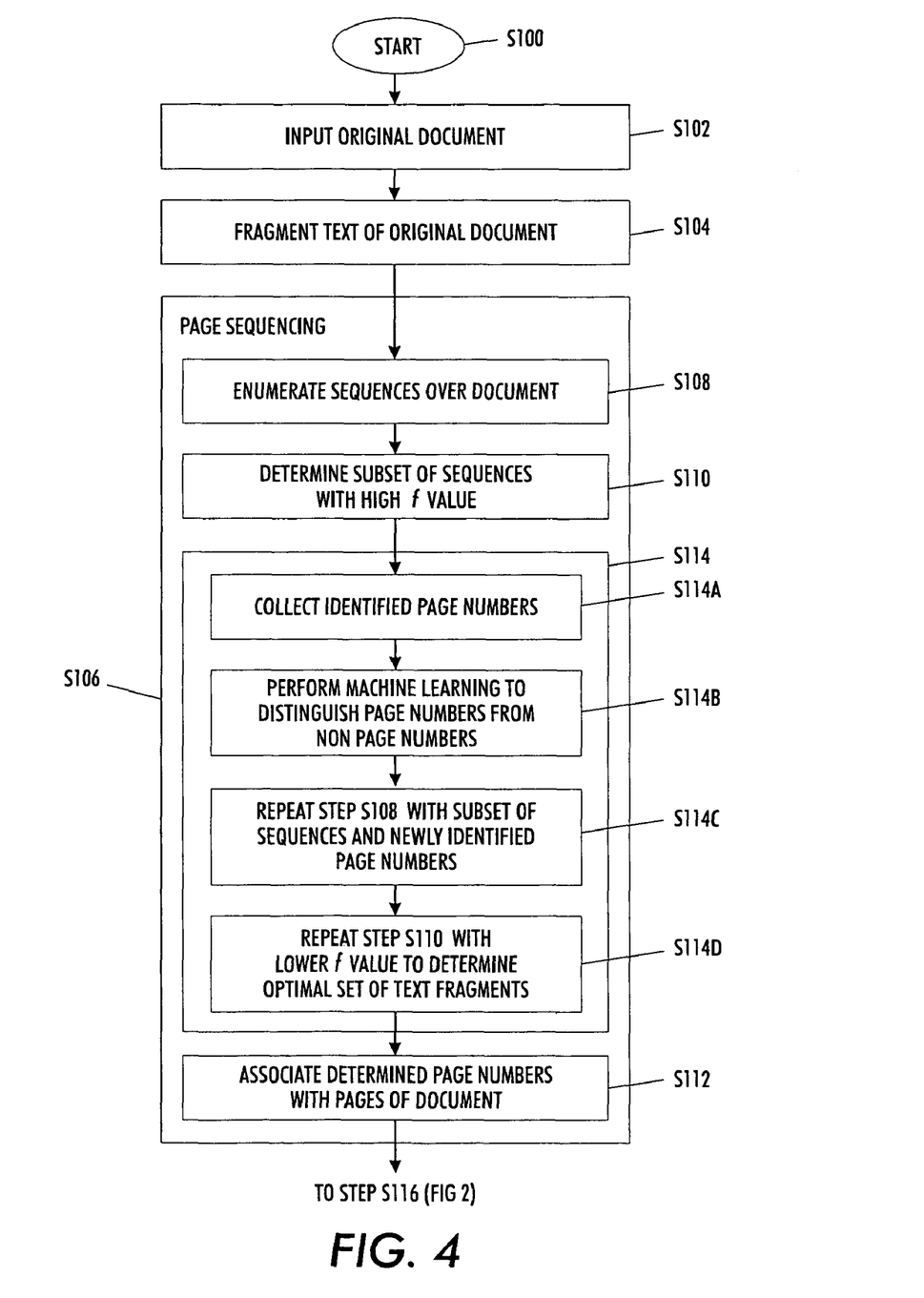
FIG. 4 is a flowchart for a method of detection of page numbers of an original document in accordance with another aspect of the exemplary method.

For example, a method which employs such a machine learning approach is illustrated in FIG. 4. The method of FIG. 4 is particularly suited to identification of sequences having fewer than f terms. First, the exemplary method is performed on a document up to step S110, as for the method of FIG. 2, with the Viterbi step (S110) employing a first length constraint value $f=f_1$. The value $f_1$ may be selected to provide a good precision in the identification of page number terms, but which does not necessarily identify all the terms (in particular, for sequences shorter than f). For example, f, may be at least 1, such as at least 1.5 or at least 2.

In one embodiment, step S114 is performed irrespective of whether all pages in the document are covered by a term. In another embodiment, step S114 is only performed where one or more pages of the document is covered by a hole. Step S114 may include the following substeps: At substep S114A, at least a group of those text fragments which have been recognized as comprising page numbers at step S110 are selected. In one embodiment, all text fragments which have been recognized as comprising page numbers at step S110 are selected.

At step S114B, a machine learning method (for example logistic regression) is applied with the following input data:

a. Positive examples corresponding to the selected, already-recognized page number terms.
b. Negative examples, which may be drawn randomly from among the rest of the text fragments of the pages.
c. The features used (how to characterize a text fragment for the machine learning method) may be selected from the following: position of the fragment within the page, font-name, font-size, font-color, other layout information, and combinations thereof.

In one embodiment, the number of negative examples is proportional to the number of positive examples, for example, approximately in the same ratio as they appear in the document. Some machine learning methods are best served by having an almost equal number of positive and negative examples. In one embodiment, negative examples are drawn from those pages where a page number has been recognized as part of a sequence and are not drawn from pages where a page number was not recognized. This reduces the risk that a missed page number is used as a negative example.

The machine learning method is trained with these data and a model is generated. The model is then applied over the text fragment data in order to identify potential page numbers. In one embodiment, the model is applied to all text fragments in the document. In another embodiment, the model may be applied to fewer than all text fragments, such as only those text fragments which were not previously identified as being page numbers. In general, the model may distinguish those text fragments which have a probability of comprising page numbers from text fragments which are probably not page numbers. For example, the machine learning step output may be a classification of text fragments as either "potential numbers" or "not potential page numbers."

At step S114C, a step analogous to step S108 may be performed to see if any of the text fragments identified at step 114B as "potential page numbers" form a sequence with the subset of sequences previously identified at step S110.

At step S114D, the method as described for step S110 may be repeated, but with the following modifications. First, a second length factor $f=f_2$ may be used. In general, the second length factor is more prone to accepting shorter sequences than the first length factor. The value $f_2$ may thus be lower than the $f_1$ value. For example $f_2$ may be lower than 1, which permits the detection of sequences of length 1. Second, the algorithm may examine fewer sequences than at step S110. For example, the determination of optimal sequences may be carried out using only the subset of sequences of text fragments already identified in step S110 (using a high f value) plus any additional text fragments identified as "potential page numbers" in the machine learning method (step S114B). These potential page numbers may have been added to the sequences at step S114C or they may be considered as new sequences of one or more terms. Third, a sequence, for purposes of step S114D, can have as few as one text fragment term. Since only those text fragments likely to be page numbers are taken into account in step S114D, the length constraint (parameter $f_2$) can be relaxed and sequences of length 1 are recognized. It is estimated that this method still provides a good precision but with a better recall.

Step S114D may be followed by step S112, in which identified terms from Step S114 may be associated with their respective pages of the document. The method may then proceed to step S116, as for the method of FIG. 2.

In another embodiment, the scoring function for sequences may include one or more factors which take into account the similarity of the terms in the sequence.

$$\text{score(node)} = 1 - \frac{f}{\text{length(sequence)}} * ft * fs * tp$$

where ft is a font type factor, fs is a font size factor, tp is a term position factor, etc. For example, if all the terms in a sequence (or portion of the sequence used in the path through the matrix) use the same font type (such as Times New Roman, Courier, etc), the font type factor ft may have a maximal value (e.g., 1). Where one or more of the terms of the sequence or portion of the sequence has a different font type, then that node may be accorded a lower ft value than other nodes. Similarly, if the font is of a different size than other terms in the sequence, a node may be accorded a lower fs value. Also, if a term is found in a different location from that of other nodes in the sequence, it may be accorded a lower tp value. The number and type of the similarity factors, and the weights each factor is accorded in the scoring function is of course not limited to those described herein.

Modifications to the above method described with reference to FIGS. 2 and 4 may be made to improve the processing speed. In one embodiment, when enumerating the sequences (step S108), sequences that become too sparse after a given point may be inactivated. This is typically the case when a sequence corresponds to a page numbering that covers only a part of the whole document. This modification reduces the size of the third nested loop in the algorithm (i.e., the step specifying: If the sequence did not consume any text fragment on this page: feed it with a "hole" is no longer applied once the sequence is inactivated). The inactivated sequences may be stored separately until step S110 is performed, thereby reducing the size of the for each sequence loops in the algorithm. In one embodiment, a predefined minimum sequence density (ratio of the number of observations to the page coverage of the sequence) is applied. Once the density drops below this value, the sequence is no longer populated as each subsequent page of the document is examined but remains of a fixed coverage corresponding to the last term which was identified. In another embodiment, the user may be permitted to input a minimum sequence density, via the user interface 38.

Figure 5:
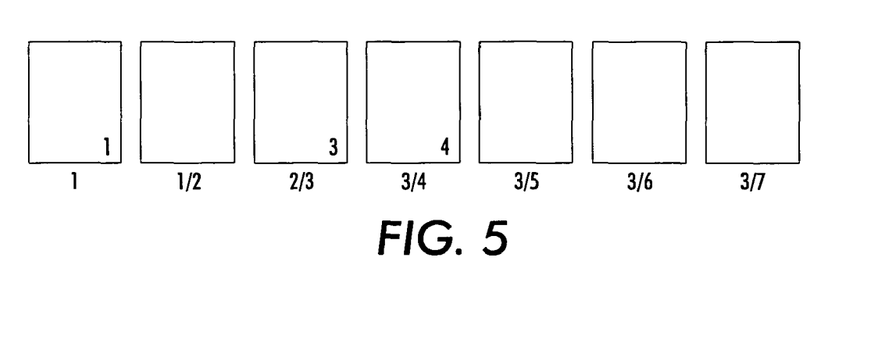
FIG. 5 schematically illustrates pages of an original document and terms of a sequence identified for the pages in a modification to the exemplary method in which a sequence is terminated once it becomes too sparsely populated.

For example, FIG. 5 shows a sequence of seven pages sparsely numbered. The italic numbers under each page indicate the density up to each page of the corresponding Arabic numeral sequence. Depending on the minimum sequence density, this Arabic sequence will be inactivated sooner or later in the document. Assume, for example, that the minimum sequence density is 0.4 (i.e., permitting no more than 2 holes in 5 nodes), the minimum will be reached at the fifth page and thereafter, no further nodes are added to the sequence and the sequence is inactivated at page 5, which is considered as a hole for the sequence (and thus the sequence terminates at page 4). Thus, even if a term which would have fitted the sequence is present on a page which occurs after the sequence is inactivated, that term will not appear in the sequence.

Figure 6:
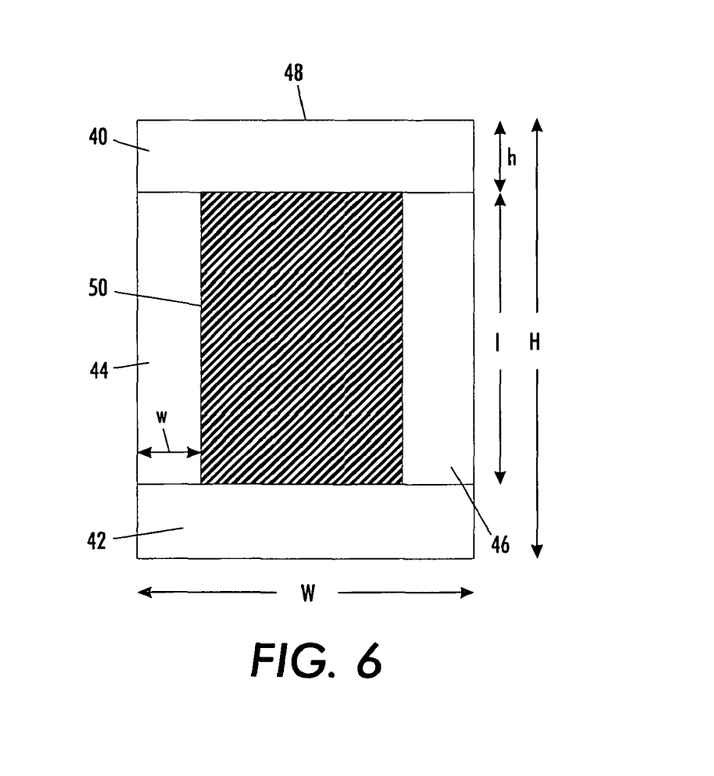
FIG. 6 illustrates areas of a page which are considered as sources of terms of a page number sequence in accordance with one aspect of the exemplary embodiment.

In another modification, rather than considering all fragments which appear on a given page, only those in a predefined region or regions which together comprise less than the entire area of the page are considered. For example, the text fragments that are close to the border of the page are considered as potential numbers of a sequence. In one embodiment, the software of the processor 10 may permit the user to define the margin size as a percentage of the page size/height. For example, as shown in FIG. 6, only the regions 40, 42, 44, and 46 at the top and bottom and left and right sides of a page 48 are considered as sources of terms. Thus, only those fragments touching the white regions (or alternatively entirely contained in them) are considered. This assumes that page numbers are unlikely to be found in the shaded middle region 50. In one embodiment, the method considers all four regions for finding a subsequent term in a sequence. The top and bottom regions 40, 42 may have a height h proportional to the page height H. The left and right regions 44, 46 may have a width w proportional to the page width W, and may have a height/limited by the top and bottom regions. In another embodiment, only the region in which the preceding term was found is considered (which may take into account possible shift of the term for left and right pages).

These two modifications can speed up the processing by reducing the number of enumerated sequences while having little or no impact on the quality of the result. For example, a minimum sequence density of at least 20%, e.g., at least 30% may be selected. The margins may be set to at least about 15%, e.g., 20% or more of the page width/height up to the maximum possible value of 50%, such as about 40% or less, e.g., less than 30%. In combination, these two modifications can at least double the processing speed and can increase it by a factor of 4 or more, depending on the margin size and minimum sequence density selected.

A variety of applications for the exemplary system and method exist, as noted above. Indexing the pages of a converted document by their page number is valuable in the domain of digital libraries. The method also finds application in the detection of a Table of Contents of a document. Methods for detecting the Table of Contents of a document are described, for example, in above-mentioned Published Application Nos. 2006/0155700 and 2006/0155703 and in co-pending application Ser. Nos. 11/360,951; 11/360,963; and 11/116,100, incorporated by reference. The exemplary method, when used in conjunction with a method as disclosed in one or more of these references may improve both the precision and speed of a Table of Contents detector. For example, the search for section headings may be restricted to pages where a page numbering sequence starts or where no page number was found. This essentially removes the section inner pages from consideration.

In another embodiment, the detected page numbers may be utilized as a landmark which enables the correction of any translation/skew introduced by a scan step. This method relies on the assumption that the page numbers are at a constant vertical position on all pages (or at least, on all pages of a sequence).

In another embodiment, the exemplary method may be incorporated into a header/footer detection method, as disclosed, for example, in above-mentioned Published Application No. 2006/0156226, incorporated by reference. The method of 2006/0156226 may be modified to apply it to the series of page ranges defined by the sequences rather than to the entire document. The rationale for this approach is that in certain collections, the headers, footers and page numbering can be section specific.

The family of page numbering is readily extended in order to account for particularities of a document collection. For example, a collection may have been observed to include pages that have a double page number like 3/4 (these may be A3 pages in the original document), which may yield sequences like 1, 2, 3/4, 5/6, 7, 8, 9/10. A numbering sequence family can be tailored to the observations, although the extrapolation of page numbers may not always be possible in a systematic manner.

Without intending to limit the scope of the exemplary embodiment, the following examples demonstrate the accuracy and efficiency of the exemplary method.

EXAMPLE 1

Table 1 shows the impact of the minimum density and margin size on the number of sequences identified, for a 65 page PDF document. When the margins (left, right, top, bottom) are each 50% of the respective page width and height (i.e., full page coverage), and the minimum density is set to 0%, the processing speed for the document is at 1 page/second (p/s). The processing speed increases to 32 p/s without any loss in quality (the 9 tests gave the same quality) when the minimum density is increased and the margin size is reduced. Table 1 shows the number of enumerated sequences and the processing speed as a function of the margin size and required density:

TABLE 1

| | No. of enumerated sequences and speed in page/second | | |
|---|---|---|---|
| Margin | Min density = 0% | Min density = 25% | Min density = 50% |
| 10% | 31 sequences, 16 p/s | 24 sequences, 32 p/s | 22 sequences, 32 p/s |
| 25% | 76 sequences, 2 p/s | 39 sequences, 10 p/s | 25 sequences, 13 p/s |
| 50% | 282 sequences, 1 p/s | 82 sequences, 4 p/s | 65 sequences, 7 p/s |

EXAMPLE 2

The exemplary method was evaluated on a set of 28 documents. Most of the documents were technical documents, a few were magazines or books, five were short, hand-made test cases and some were OCR-ed documents. The documents were collected on the Internet and, as is common, they displayed missing page numbers and various numbering schemes, or even no page number at all. The documents totaled 1600 pages.

The method was performed with the default parameters: density=30%, margin=20%, f=2.5 (f is the length factor). No verification step (step S114) was performed. After the method was applied, the assigned page numbers were manually checked for errors. TABLE 2 illustrates the results obtained.

TABLE 2

| Document | % correctly numbered | Errors per page | Processing speed (p/s) |
|---|---|---|---|
| 1 | 92.1% | (3 errors for 38 pages) | 38.0 |
| 2 | 0.0% | 2 errors for 2 pages | ∞ |
| 3 | 100.0% | 0 errors for 8 pages | 8.0 |
| 4 | 100.0% | 0 errors for 40 pages | 1.0 |
| 5 | 100.0% | 0 errors for 19 pages | 19.0 |
| 6 | 100.0% | 0 errors for 4 pages p/s) | 4.0 |
| 7 | 100.0% | 0 errors for 233 pages | 12.0 |
| 8 | 100.0% | 0 errors for 18 pages | ∞ |
| 9 | 100.0% | 0 errors for 6 pages p/s | 2.0 |
| 10 | 100.0% | 0 errors for 4 pages | 4.0 |
| 11 | 95.2% | 1 errors for 21 pages | 5.0 |
| 12 | 100.0% | 0 errors for 65 pages | 13.0 |
| 13 | 93.9% | 2 errors for 33 pages | 16.0 |
| 14 | 100.0% | 0 errors for 103 pages | 34.0 |
| 15 | 96.6% | 4 errors for 116 pages | 2.0 |
| 16 | 100.0% | 0 errors for 4 pages | 4.0 |
| 17 | 100.0% | 0 errors for 112 pages | 37.0 |
| 18 | 100.0% | 0 errors for 88 pages | 44.0 |
| 19 | 100.0% | 0 errors for 58 pages | 3.0 |
| 20 | 100.0% | 0 errors for 59 pages | 4.0 |

TABLE 2-continued

| Document | % correctly numbered | Errors per page | Processing speed (p/s) |
|---|---|---|---|
| 21 | 100.0% | 0 errors for 200 pages | 5.0 |
| 22 | 100.0% | 0 errors for 28 pages | 14.0 |
| 23 | 100.0% | 0 errors for 298 pages | 5.0 |
| 24 | 100.0% | 0 errors for 7 pages | ∞ |
| 25 | 100.0% | 0 errors for 6 pages | ∞ |
| 26 | 100.0% | 0 errors for 7 pages | ∞ |
| 27 | 100.0% | 0 errors for 7 pages | ∞ |
| 28 | 100.0% | 0 errors for 7 pages | ∞ |
| Total | 99.2% | 12 errors for 1591 pages | 6.0 |
| | | Total time = 261.0 secs | |

Note that the processing speed of ∞ indicates that the duration of processing was less than 0.5 seconds. Thus, an estimate of the processing speed could not be made with great accuracy.

Setting the minimum density to 0 and the margins to the whole page leads to the exact same result, but with an increased processing time. This suggests that, despite the noise introduced by looking at any possible sequence in the whole document, the correct sequences emerge in the exemplary method even without limiting the region examined.

Most of the errors observed were attributed to the presence of sequences of length 1 or 2, which are not caught with a length factor of 2.5. By lowering this factor, for example, to 1.5, then the method increases in recall. However, this is accompanied by a decrease in precision because of a tendency to find false positives, since the probability for finding a sequence of length 2 on two consecutive pages increases. Therefore pages without page number could become wrongly numbered. In this example, no positional or typographic property was exploited.

Table 3 below shows page numbering of four documents, after a manual examination for missing numbers. Not all pages are shown for the second and fourth lengthy documents. The exemplary method missed two sequences of length 1 and one sequence of length 2. In addition, it missed three numbers of the last document because their 2 digits were separated by a space in the XML produced by the PDF-to-XML converter used in the test.

TABLE 3

| Document 1 | Document 2 | Document 3 | Document 4 |
|---|---|---|---|
| None | None | None | None |
| 1 <MISSED> | None | None | None |
| A-1 | None | None | 1 |
| A-2 | None | None | 2 |
| A-3 | 1/1 | | 3 |
| A-4 | 1/2 | | 4 |
| B1-1 | 1/3 | | 5 |
| B1-2 | 1/4 | | 6 |
| B1-3 | 1/5 | | 7 |
| B1-4 | 1/6 | | 8 |
| B2-1 | 1/7 | | 9 |
| B2-2 | 1/8 | | 10 <MISSED> (appears as 1 0 in the XML) |
| B2-3 | 1/9 | | |
| B2-4 | 1/10 | | 11 <MISSED> (appears as 1 1 in the XML) |
| B2-5 | 1/11 | | |
| B2-6 | 1/12 | | 12 <MISSED> (appears as 1 2 in the XML) |
| C-1 | 1/13 | | |
| C-2 | 1/14 | None | |
| C-3 | 1/15 | | I <MISSED> |
| C-4 | 1/16 | | 1 |
| C-5 | 1/17 | | 2 |
| C-6 | 1/18 | | 3 |
| C-7 | 1/19 | | 4 |
| C-8 | 1/20 | | 5 |
| D1-1 | 1/21 | | [ . . . ] |
| D1-2 | 1/22 | | 57 |

TABLE 3-continued

| Document 1 | Document 2 | Document 3 | Document 4 |
|---|---|---|---|
| D1-3 | 1/23 | | 58 |
| D1-4 | 1/24 | | 59 |
| D2-1 | 1/25 | | 60 |
| D2-2 | None | | F-1 |
| D2-3 | 2/1 | | F-2 |
| D2-4 | 2/2 | | [ . . . ] |
| D3-1 | 2/3 | | F-36 |
| <MISSED> | 2/4 | | F-37 |
| D3-2 | 2/5 | | None |
| <MISSED> | 2/6 | | None |
| E-1 | 2/7 | | None |
| E-2 | [ . . . ] | | |
| E-3 | | | |
| 3 errors | 0 error | 0 error | 4 errors |

EXAMPLE 3

In this Example, positional information was used to verify identified page numbers (Step S114) using data from Example 2. In particular, detected page number positions identified at step S110 were clustered on a 2D space (using an agglomerative complete link clustering, separately performed on i) all odd pages, ii) even pages, iii) all pages). A set of clusters with a certain maximal internal distance was then determined and used to filter out terms enumerated in step S108 of the primary method. A Viterbi with f=0.5 was then used in a repeat of step S110. This approach was found to increase the overall accuracy of detection from 99.2% to 99.5%, with four fewer errors.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for detection of page numbers in a document comprising:
   identifying a plurality of text fragments associated with a plurality of pages of a single document;
   from the identified text fragments, identifying at least one sequence, each identified sequence comprising a plurality of terms, each term derived from a text fragment selected from the plurality text fragments, the terms of a sequence complying with at least one predefined numbering scheme which defines a form and an incremental state of the terms in a sequence, the at least one numbering scheme excluding terms from a sequence which do not comply with an incremental state in which terms on each two consecutive pages vary by a constant value, the identifying of the at least one sequence comprising, for each page of a plurality of pages of the document in sequence:
   identifying text fragments which comprise a term that complies with the form of the predefined numbering scheme;
   for each of the identified fragments, determining if the term of the identified fragment complies with an incremental state accepted by an existing sequence and if so, adding the term to that sequence, the existing sequence comprising at least one term derived from a text fragment of a previous page of the document; and for each of the terms which do not comply with an incremental state accepted by an existing sequence, considering the term as a potential start of a new sequence;

with a computer processor, computing a subset of the identified sequences which cover at least some of the pages of the document, wherein the computing of the set of sequences comprises applying a Viterbi algorithm to the identified sequences to identify a subset of the identified sequences; and construing of at least some of the terms of the subset of the identified sequences as page numbers of pages of the document.

2. The method of claim 1, wherein the at least one numbering scheme includes a numbering scheme selected from the group consisting of Arabic numerals, Roman numerals, composite numbering, Ascii characters, and combinations thereof.

3. The method of claim 1, wherein the identifying of the at least one sequence further comprises:

for an existing sequence for which no term is added for the page, performing at least one of:

terminating the sequence whereby no further terms are added to the sequence for subsequent pages; and adding a hole to the sequence to identify the sequence as lacking a term for the page.

4. The method of claim 3, wherein the sequence is terminated when a sequence density is below a predefined minimum sequence density.

5. The method of claim 1, wherein the computing subset of the identified sequences comprises:

for each of the identified sequences, defining the identified sequence as a series of nodes, each node representing a state of the sequence for a page of a plurality of consecutive pages, each node comprising a term or a hole, wherein a hole identifies the page as lacking a term of the sequence;

selecting a subset of identified sequences based on assigned scores of nodes of the subset of identified sequences which cover at best the entire document, the assigned score of each node of the selected sequences being a function of at least one of:

whether the node comprises a hole or a term, a number of terms in the sequence, and a coverage of the sequence.

6. The method of claim 5, wherein when the node comprises a term, the assigned score is a function of at least one of:

a number of terms in the sequence; and a coverage of the sequence.

7. The method of claim 5, wherein the selecting a subset comprises accepting a sequence into the subset only at its first node and terminating the sequence before its last node whereby for each page, the subset includes a node of no more than one sequence.

8. The method of claim 5, wherein the selecting of the subset of the identified sequences includes, where none of the identified sequences includes one term from each page of the document, combining at least two sequences which maximize a sum of the scores of each node by selecting a plurality of consecutive nodes of each of the two sequences.

9. The method of claim 5, wherein the selecting of the subset of identified sequences based on assigned scores of nodes of the subset of identified sequences includes summing the scores of nodes in the sequences, no more than one score per page being summed.

10. The method of claim 1, wherein the identifying of the plurality of text fragments associated with a plurality of pages of a document comprises identifying the text fragment within at least one designated region of each of the pages, the at least one region having an area which is less than an area of the page.

11. The method of claim 1, further comprising: verifying the selected subset of sequences by comparing a similarity of at least one feature of the text fragments comprising the sequences.

12. The method of claim 11, wherein the at least one feature is selected from the group consisting a positional feature, an appearance feature, and combinations and multiples thereof.

13. The method of claim 1, further comprising:

where the form of the sequence permits extrapolation of the sequence with an acceptable degree of confidence, extrapolating sequences of the subset to identify terms for holes in the sequences.

14. The method of claim 1, further comprising:

identifying additional text fragments having as potential page numbers by comparing at least one feature of text fragments not in the identified subset of sequences with at least one feature of text fragments in the identified subset of sequences;

computing an optimal set of text fragments based on the text fragments of the subset of sequences and the additional identified text fragments; and wherein the construing terms of at least some of the text fragments in the subset of the identified sequences as page numbers of pages of the document comprises construing terms of the optimal set of text fragments as page numbers of pages of the document.

15. The method of claim 14, wherein the computing of the optimal set of text fragments comprises applying the Viterbi algorithm to the identified sequences in the subset and the additional text fragments to identify a subset of text fragments covering at best the entire document.

16. The method of claim 1, wherein the identifying of the plurality of text fragments associated with a plurality of pages of a document comprises identifying text fragments associated with a predefined portion of each page for the pages of the document.

17. A system for detection of page numbers in a document comprising a processor which executes instructions for performing the method of claim 1.

18. A tangible medium on which instructions for performing the method of claim 1 are recorded.

19. A system for detection of page numbers comprising:

memory which stores instructions for:

(a) identifying a plurality of text fragments associated with a plurality of pages of a document, from the identified text fragments;

(b) identifying at least one sequence, each identified sequence comprising a plurality of terms, each term derived from a text fragment selected from the plurality text fragments, the terms of a sequence complying with at least one predefined numbering scheme which defines a form and an incremental state of the terms in a sequence that enforces an increase of the page number over a sequence of pages;

(c) the at least one predefined numbering scheme excluding terms from a sequence which do not comply with an incremental state in which terms on each two consecutive pages vary by a constant value, the identifying of the at least one sequence comprising, for each page of a plurality of pages of the document in sequence:

(d) identifying text fragments which comprise a term that complies with the form of the predefined numbering scheme;

(e) for each of the identified fragments, determining if the term of the identified fragment complies with an incremental state accepted by an existing sequence and if so, adding the term to that sequence, the existing sequence comprising at least one term derived from a text fragment of a previous page of the document; and (f) for each of the terms which do not comply with an incremental state accepted by an existing sequence, considering the term as a potential start of a new sequence;

(g) computing a subset of the identified sequences which cover at least some of the pages of the document, wherein the computing subset of the identified sequences comprises:

for each of the identified sequences, defining the identified sequence as a series of nodes, each node representing a state of the sequence for a page of a plurality of consecutive pages, each node comprising a term or a hole, wherein a hole identifies the page as lacking a term of the sequence;

selecting a subset of identified sequences based on assigned scores of nodes of the subset of identified sequences which cover at best the entire document, the assigned score of each node of the selected sequences being a function of at least one of:

whether the node comprises a hole or a term,
a number of terms in the sequence, and
a coverage of the sequence; and (h) construing terms of the subset of sequences as page numbers of pages of the document; and a processor which executes the instructions.

20. The system of claim 19, wherein the instructions for identifying of the at least one sequence comprises, for each page of a plurality of pages of the document in sequence instructions for:

identifying text fragments which comprise a term that complies with the form of the predefined numbering scheme;

for each of the identified fragments, determining if the term of the identified fragment complies with an incremental state accepted by an existing sequence and if so, adding the term to that sequence, the existing sequence comprising at least one term derived from a text fragment of a previous page of the document; and for each of the terms which do not comply with an incremental state accepted by an existing sequence, considering the term as a potential start of a new sequence.

21. The system of claim 19, wherein the processor annotates the documents with page numbers comprising terms of the subset of sequences.

22. A method for detection of page numbers in a document comprising:

receiving an input document comprising scanned pages;

identifying a plurality of text fragments associated with a plurality of the scanned pages of the document, each of the identified fragments including a term which complies with a form of at least one predefined numbering scheme;

with a computer processor, for each page of the plurality of pages in turn:

a) for each identified text fragment of the page, determining whether an existing sequence will accept the text fragment, a sequence only accepting a text fragment if the text fragment fits with the form of at least one predefined numbering scheme for the existing sequence and fits an incremental state for the existing sequence, b) for each existing sequence, if the sequence will accept a text fragment, adding the term of the text fragment to the existing sequence and incrementing its state, c) for each identified text fragment that has not been added to any of the existing sequences, start a new sequence which includes the text fragment term, the new sequence serving as an existing sequence for a subsequent page of the document, d) for each existing sequence to which no text fragment term is added for the scanned page, feeding the sequence with a hole which designates the absence of a text fragment term for the sequence for that scanned page, and e) for each sequence which does not meet a predefined minimum density, closing the existing sequence against addition of fragment terms from subsequent scanned pages of the document, the predefined minimum density being a function of a total number of terms in the existing sequence and a total number of holes in the existing sequence;

computing a subset of the sequences, wherein the computing subset of the identified sequences comprises:

for each of the identified sequences, defining the identified sequence as a series of nodes, each node representing a state of the sequence for a page of a plurality of consecutive pages, each node comprising a term or a hole, wherein a hole identifies the page as lacking a term of the sequence;

selecting a subset of identified sequences based on assigned scores of nodes of the subset of identified sequences which cover at best the entire document, the assigned score of each node of the selected sequences being a function of at least one of:

whether the node comprises a hole or a term,
a number of terms in the sequence, and
a coverage of the sequence;

extrapolating sequences of the subset to identify terms for holes in the sequences; and construing terms of the subset of sequences, including any terms for holes identified by extrapolation, as page numbers of pages of the scanned pages of the document.

23. The method of claim 22, wherein the computing of the set of sequences comprises applying a Viterbi algorithm to the identified sequences to identify a subset of the identified sequences.

24. The method of claim 22, further comprising:

where holes are identified, identifying additional text fragments of the document as potential page numbers by comparing features of the additional text fragments with features of the text fragments of the identified sequences; and construing terms of the additional fragments as page numbers of pages of the document.

25. A method for detection of page numbers in a document comprising:

identifying a plurality of text fragments associated with a plurality of scanned pages of a document;

from the identified text fragments, identifying at least one sequence, each identified sequence comprising a plurality of terms, each term derived from a text fragment selected from the plurality text fragments, the terms of a sequence complying with at least one predefined numbering scheme which defines a form and an incremental state of the terms in a sequence;

computing a subset of the sequences comprising scoring nodes of the sequences based on a length of the sequence as a function of a first length factor, each term in the sequence being represented by a separate node;

developing a model for identifying additional text fragments as potential page numbers, the model being based on at least one feature of at least one text fragment from which the terms of the first subset of sequences are derived;

applying the model to at least some of the identified text fragments in the document to identify additional text fragments that are potential page numbers;

with a computer processor, computing an optimal set of terms from the subset of the sequences and additional text fragments comprising:

scoring nodes of the sequences and additional text fragments based on a length of the sequence or additional text fragment as a function of a second length factor which is more prone to accept shorter sequences than the first length factor; and construing at least some of the terms of in the optimal set as page numbers of pages of the document.

* * * * *